United States Patent [19]

Ruzic

[11] 4,237,350

[45] Dec. 2, 1980

[54] TELEPHONE HANDSET

[75] Inventor: Hugo Ruzic, Leonberg, Fed. Rep. of Germany

[73] Assignee: International Standard Electric Corporation, New York, N.Y.

[21] Appl. No.: 10,858

[22] Filed: Feb. 9, 1979

[30] Foreign Application Priority Data

Feb. 18, 1978 [DE] Fed. Rep. of Germany ....... 7804970

[51] Int. Cl.³ .................... H04M 1/02; H04M 1/03
[52] U.S. Cl. ................................ 179/103; 179/179
[58] Field of Search ............... 179/103, 179, 178

[56] References Cited

U.S. PATENT DOCUMENTS

| | | | |
|---|---|---|---|
| 2,907,836 | 10/1959 | Henrikson et al. | 179/103 |
| 4,130,740 | 12/1978 | Cogan | 179/103 |
| 4,163,875 | 8/1979 | Cogan | 179/179 |

*Primary Examiner*—Daryl W. Cook
*Attorney, Agent, or Firm*—John T. O'Halloran; Jeffrey P. Morris

[57] ABSTRACT

The handset consists of two parts, i.e. the smooth upper part and the lower part containing the receptacles for the electro-acoustic transducers. Considering that the various makes of transducers may vary in both their diameters and electric terminals, the annular transducer receptacle is stepped on its inside. For transducers with soldering or plug terminals contact springs are not needed. For transducers having contact surfaces, contact springs are retrofitable in a simple way.

7 Claims, 6 Drawing Figures

TELEPHONE HANDSET

BACKGROUND OF THE INVENTION

1. Field of the Invention

The present invention relates to a telephone handset having a two-part plastic housing divided in the longitudinal direction.

2. Description of the Prior Art

Mounting electro-acoustic transducers (receiver and microphone capsules) inside the handset can be carried out in various ways. In the arrangements according to the German Published Patent Application (DE-OS) 24 40 841 and the German Printed Patent Application (DE-AS) 24 40 985 there is used, for example, a ring gripping over the transducer, with the ring being attached inside the handset by way of a bayonet joint.

Other ways of mounting electro-acoustic transducers inside the housings of handsets are known from the German Published Patent Application (DE-OS) 20 61 692. In one type of embodiment there is used a U-shaped wire clip resting at certain points on the transducer and clamped at other points inside the casing, while in another type of embodiment a U-shaped flat spring serves the same purpose, with the latter being screwed to the housing. Other embodiments use a tape of flexible material which is pulled over the capsule, or screwed-on flat springs which simultaneously serve the mechanical fixing in position and the electrical contacting of the transducer. In a further embodiment, an annular rib with extensions or engaging portions gripping over the transducer is attached to the housing of the handset, in which the transducer capsule is pushed or engaged respectively.

SUMMARY OF THE INVENTION

It is the object of the invention to provide a handset which, in a simple way, permits the accommodation of acoustic transducers of various types, i.e. with differently designed electric terminals and/or differently large diameters. The solution according to the invention permits the use of transducer capsules of various makes. Thus it is possible to use transducers having soldering or plug-in terminals as well as transducers having contact areas. In the latter case, two contact springs are retrofitable and capable of being inserted without further ado. This only requires minor preparations. By stepping the receiving ribs on their inside it is possible, moreover, to use transducer capsules having various outer diameters. This, considerably enlarges the versatility of the handset.

In the following description, the invention will now be explained in greater detail with reference to preferred embodiment shown in FIGS. 1 to 3 of the accompanying drawings, in which:

DESCRIPTION OF THE PREFERRED EMBODIMENT

Figures 1A, 1B:
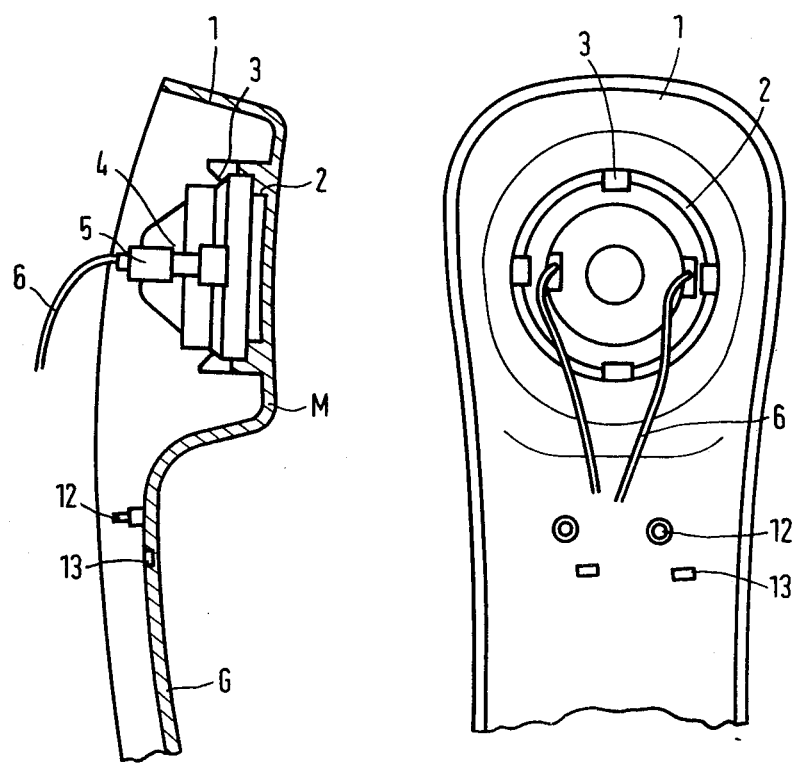
FIGS. 1a and 1b show one half of the lower part of the handset according to the invention, equipped with a transducer capsule having plug-in terminals, in both a top and sectional view.

In the drawings, the lower part of a telephone handset consisting of two plastics parts, is indicated by the reference numeral 1. The top part of the handset is not shown in the drawings as being of no significance in connection with the present invention. To the lower part 1, the caps M are moulded at both ends, for accommodating the acoustic transducers, hence the receiver and the microphone capsules. Considering that both cap portions M are designed analogously, only one of them is shown in the drawings. The handle piece G connecting the cap members is broken away in about the center.

The transducers are secured in position by annular ribs 2 which are provided with two to four engaging hooks 3, engaging behind the transducer.

FIGS. 1a and 1b show an acoustic transducer 4 to be inserted in the cap portion M, with the electric terminals of the transducer shown to be led out as lugs, on which the spade terminals 5 of the lead-in conductors 6 are slipped. If so required, the latter may also be connected by way of soldering.

Figure 2A:
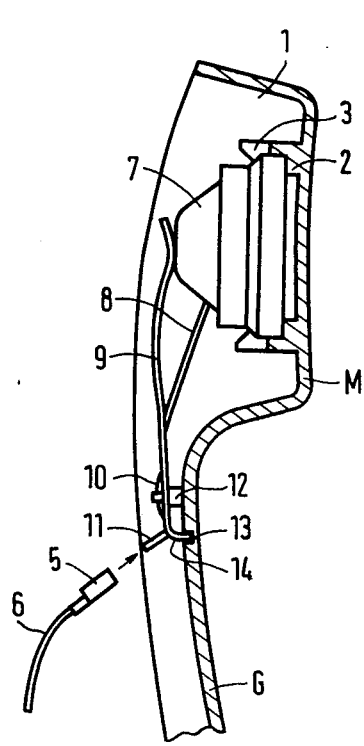
FIGS. 2a and 2b show the same lower part as in FIGS. 1a and 1b, but with a transducer capsule having contact surfaces, as well as equipped with contact springs, in two different views.
Figure 2B:
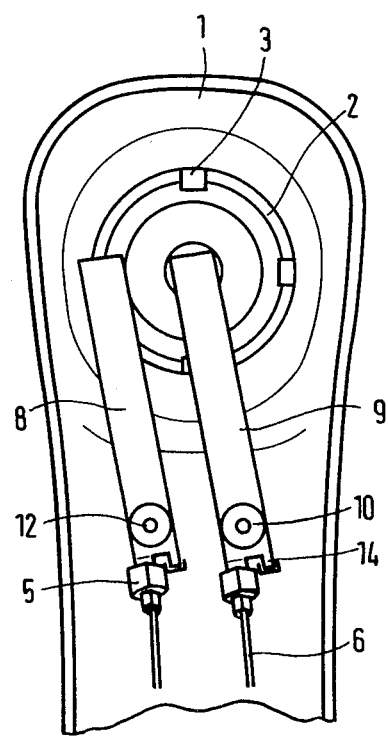
Figures 3A, 3B:
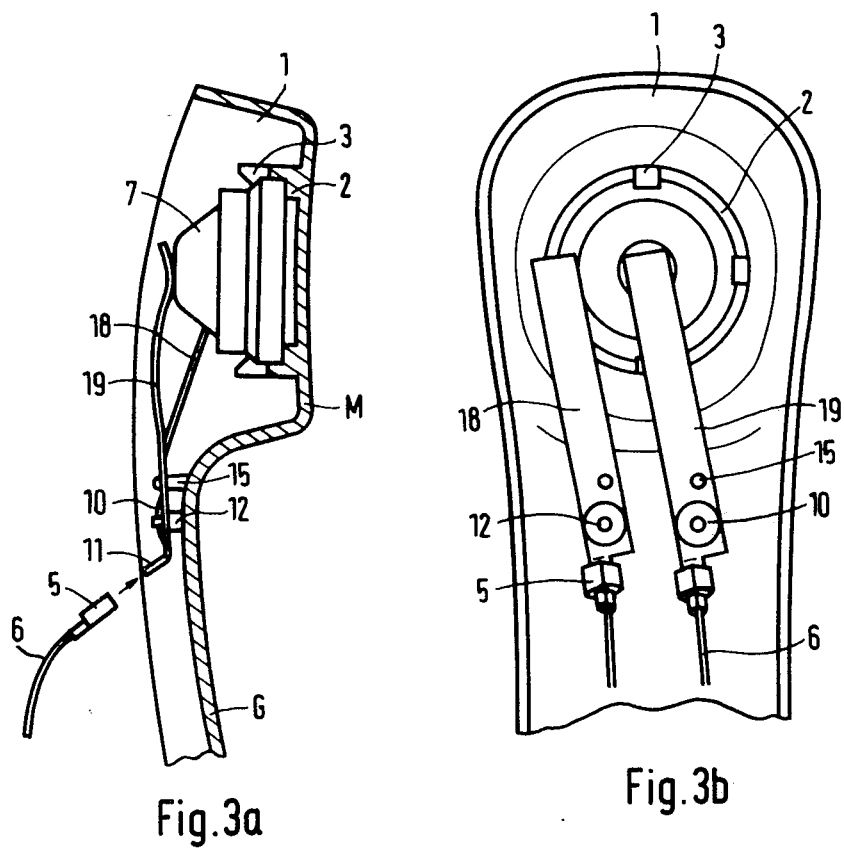
FIGS. 3a and 3b show a similar embodiment as in FIG. 2, in two different views.

If, instead of these transducers, there are used transducers having contact surface areas, a different connecting facility must be provided for the lead-in conductors 6. FIGS. 2a and 2b as well as FIGS. 3a and 3b show the use of such transducers 7 having contact surface areas. These areas are contacted by flat springs 8 and 9 or 18 and 19 respectively, which are attached to the lower part 1. For the mounting in position, pegs 12 are provided for next to the transducer receptacle, preferably inside the handle member G, onto which the contact springs 8 and 9 or 18 and 19 are slipped. Therefore, the latter are provided with corresponding holes.

The pegs 12, as shown, may be provided with steps or shoulders in case the contact springs are not supposed to rest on the wall of the lower part 1 of the handset. After a contact spring has been placed on such a peg, the spring is fixed in position by pressing a locking disk 10 on to the peg 12. The hole in the center of the locking disk 10 is in its diameter somewhat smaller than the peg 12 and is appropriately provided with radial slots. In this way the locking disk can be easily placed on to the peg, as the segments of the disk give way. The disk, however, is prevented from becoming loose on its own because the segments become locked on the peg in the opposite direction.

The contact springs 8, 9 and 18, 19 are bent in such a way as to touch the corresponding contact surfaces of the transducers 7, as is shown in FIGS. 2a and 3a. at their other ends, the contact springs are provided with a connecting member 11 for connecting the lead-in wire 6. Appropriately, these connecting members 11 have the same dimensions as the connecting locks of the transducers 4, so that the lead-in wires 6 can remain unchanged when employing other types of transducers.

As an anti-rotation lock for the contact springs in the embodiment according to FIGS. 2a and 2b, next to the connecting member 11 serving the electrical connection, there is provided a further member 14 at the rear end of the contact springs 8 and 9, which is bent off almost rectangularly in direction towards the wall of the lower part 1 where it engages in a corresponding recess 13.

In the embodiment according to FIGS. 3a and 3b, the contact springs 18 and 19 are provided with a second hole, each of which intended to be engaged by a guide pin 15 moulded to the lower part 1 of the handset. In this way the contact springs are protected from being turned away.

It is possible at any time to replace the transducers, because the contact springs can also be inserted or removed subsequently. Considering that the various makes of transducers may vary in their outer diameters, the annular rib 2 is stepped on its inside, so that smaller transducers fit in somewhat deeper, and larger ones will be positioned somewhat higher. In any case, however, electrical connections may be established as described in connection with the foregoing embodiments.

What is claimed is:

1. A telephone handset with a two-part plastic housing divided in the longitudinal direction, comprising:
   lower part means having receptacles for receiving electro-acoustic transducers, said receptacles being formed by annular rib means moulded thereto;
   engaging hook means on said annular rib means for gripping said transducers;
   peg means moulded to said lower part means; and
   contact spring means positioned on said peg means.

2. A telephone handset as claimed in claim 1, wherein said contact spring means are secured to said peg means by locking disk means.

3. A telephone handset as claimed in claim 2, wherein each of said contact spring means is positively engaged by a second peg means.

4. A telephone handset as claimed in claim 2, further comprising:
   at least one downwardly bent flap on said contact spring for engaging in a corresponding recess in said lower part means.

5. A telephone handset as claimed in claims 3 or 4, further comprising:
   one upwardly bent flap means for plugging on a spade terminal means on said contact springs.

6. A telephone handset as claimed in claim 5, wherein said upwardly and downwardly bent flaps are arranged adjacent each other at the rear end of said contact spring.

7. A telephone handset as claimed in claim 2, wherein said annular ribs are stepped on the inside thereof.

* * * * *